(12) United States Patent
Zhang et al.

(10) Patent No.: US 9,805,047 B1
(45) Date of Patent: Oct. 31, 2017

(54) SYSTEMS AND METHODS FOR RETRIEVING DATA

(71) Applicant: Symantec Corporation, Mountain View, CA (US)

(72) Inventors: Lei Hu Zhang, Beijing (CN); Cheng Wan, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 726 days.

(21) Appl. No.: 14/283,776

(22) Filed: May 21, 2014

(51) Int. Cl.
*G06F 17/30* (2006.01)

(52) U.S. Cl.
CPC .. *G06F 17/30156* (2013.01); *G06F 17/30386* (2013.01)

(58) Field of Classification Search
CPC .............. G06F 17/30156; G06F 17/30386
USPC ........................................................ 707/692
See application file for complete search history.

(56) References Cited

U.S. PATENT DOCUMENTS

| | | | | |
|---|---|---|---|---|
| 5,606,679 A | * | 2/1997 | Cohn | G06F 3/0601 710/37 |
| 6,098,148 A | * | 8/2000 | Carlson | G06F 3/0613 711/100 |
| 6,367,069 B1 | * | 4/2002 | Corbett | G06F 8/41 717/153 |
| 6,393,535 B1 | * | 5/2002 | Burton | G06F 3/0613 711/154 |
| 2006/0059474 A1 | * | 3/2006 | Bhansali | G06F 12/0276 717/151 |
| 2012/0124585 A1 | * | 5/2012 | Almasi | G06F 9/522 718/102 |
| 2012/0158664 A1 | * | 6/2012 | Anglin | G06F 17/3015 707/675 |

* cited by examiner

*Primary Examiner* — Joshua Bullock
(74) *Attorney, Agent, or Firm* — FisherBroyles LLP

(57) ABSTRACT

A disclosed computer-implemented method for retrieving data may include (1) receiving a request to retrieve data segments from a storage system that stores data segments in a plurality of data containers, (2) obtaining, for each data segment, information that indicates which data container stores the data segment, (3) determining, based on the information that indicates which data container stores each data segment, that using an initial access order to retrieve the data segments would result in visiting one or more data containers more than one time, (4) rearranging access to one or more data segments such that retrieving the data segments results in visiting the data containers at least one fewer times than using the initial access order, and (5) retrieving the data segments from the storage system based on the rearranged access order. Various other methods, systems, and computer-readable media are also disclosed.

20 Claims, 7 Drawing Sheets

SYSTEMS AND METHODS FOR RETRIEVING DATA

BACKGROUND

In an era of constant connectivity, an inability to efficiently create and maintain backups of important data can be a severe liability. Computing devices are prone to a wide variety of both temporary and fatal errors, and even temporary losses of data or services may be devastating to enterprises. The ability to quickly recover systems from a backup is crucial to enterprises that wish to maintain consistent services. Also important is the ability to quickly create and copy backups. A backup that requires substantial time to create is less likely to be frequently updated, leading to potential data losses if a failure occurs between backups, while a backup that is not replicated may itself be lost. More efficient backup replication may lead to a larger number of current copies of an organization's data, decreasing the chances that key data will be lost.

Traditional systems for replicating backups may retrieve data from a large number of locations within a data storage system. Such systems may retrieve the data without accounting for locality, leading to inefficiencies as data containers are opened and closed multiple times. Many file systems may feature prefetching abilities, which may only be effective when accessing data segments from a disk in sequential order. Accordingly, the instant disclosure identifies and addresses a need for additional and improved systems and methods for retrieving data.

SUMMARY

As will be described in greater detail below, the instant disclosure describes various systems and methods for retrieving data by rearranging access to data containers so that each container is visited fewer times than in an initial access order that may be specified in the request for data.

In one example, a computer-implemented method for retrieving data may include (1) receiving a request to retrieve a plurality of data segments from a storage system that stores the plurality of data segments in a plurality of data containers, (2) obtaining, for each data segment from the plurality of data segments, information that indicates which data container from the plurality of data containers stores the data segment, (3) determining, based on the information that indicates which data container stores each data segment, that using an initial access order to retrieve the plurality of data segments would result in visiting one or more data containers from the plurality of data containers more than one time, (4) rearranging access to one or more data segments from the plurality of data segments such that retrieving the plurality of data segments results in visiting the one or more data containers at least one fewer times than the one or more data containers would be visited using the initial access order, and (5) retrieving the plurality of data segments from the storage system based on the rearranged access order.

In one embodiment, the storage system may include a deduplication storage system where the plurality of data segments are fragmented across the plurality of data containers. In some examples, the data segments may be stored within thousands of data containers.

In one embodiment, one or more data segments may be stored adjacently within at least one data container and rearranging access to the data segments may include rearranging access to the data segments such that the data segments are accessed sequentially within the at least one data container. In some examples, retrieving the plurality of data segments may include prefetching a portion of the one or more data segments that are accessed sequentially within the at least one data container by retrieving a data segment that has not yet been requested but is predicted to be requested and is adjacent to a previous data segment that has been requested.

Determining that the initial access order may not be efficient may be done in a number of ways. In some examples, determining that using the initial access order to retrieve the plurality of data segments would result in visiting one or more data containers from the plurality of data containers more than one time may include calculating a total number of data containers that store the plurality of data segments and determining that retrieving data in the initial access order would include a greater number of instances of visiting data containers than the total number of data containers.

Additionally or alternatively, determining that using the initial access order to retrieve the plurality of data segments would result in visiting one or more data containers from the plurality of data containers more than one time may include calculating a ratio of how often data containers within the plurality of data containers would be revisited using the initial access order. In some examples, rearranging access to one or more data segments may include grouping access to data segments within the plurality of data segments by container such that each data container in the plurality of data containers is visited a single time when the plurality of data segments are retrieved.

The data segments may be correlated to data containers in a variety of ways. In one embodiment, obtaining, for each data segment from the plurality of data segments, the information that indicates which data container from the plurality of data containers stores the data segment may include retrieving the information from a database based on a fingerprint of the data container.

In one embodiment, a system for implementing the above-described method may include (1) a receiving module, stored in memory, that receives a request to retrieve a plurality of data segments from a storage system that stores the plurality of data segments in a plurality of data containers, (2) an obtaining module, stored in memory, that obtains, for each data segment from the plurality of data segments, information that indicates which data container from the plurality of data containers stores the data segment, (3) a determination module, stored in memory, that determines, based on the information that indicates which data container stores each data segment, that using an initial access order to retrieve the plurality of data segments would result in visiting one or more data containers from the plurality of data containers more than one time, (4) a rearranging module, stored in memory, that rearranges access to one or more data segments from the plurality of data segments such that retrieving the plurality of data segments results in visiting the one or more data containers at least one fewer times than the one or more data containers would be visited using the initial access order, (5) a retrieving module, stored in memory, that retrieves the plurality of data segments from the storage system based on the rearranged access order, and (6) at least one physical processor configured to execute the receiving module, the obtaining module, the determination module, the rearranging module, and the retrieving module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to retrieve a plurality of data segments from a storage system that stores the plurality of data segments in a plurality of data containers, (2) obtain, for each data segment from the plurality of data segments, information that indicates which data container from the plurality of data containers stores the data segment, (3) determine, based on the information that indicates which data container stores each data segment, that using an initial access order to retrieve the plurality of data segments would result in visiting one or more data containers from the plurality of data containers more than one time, (4) rearrange access to one or more data segments from the plurality of data segments such that retrieving the plurality of data segments results in visiting the one or more data containers at least one fewer times than the one or more data containers would be visited using the initial access order, and (5) retrieve the plurality of data segments from the storage system based on the rearranged access order. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
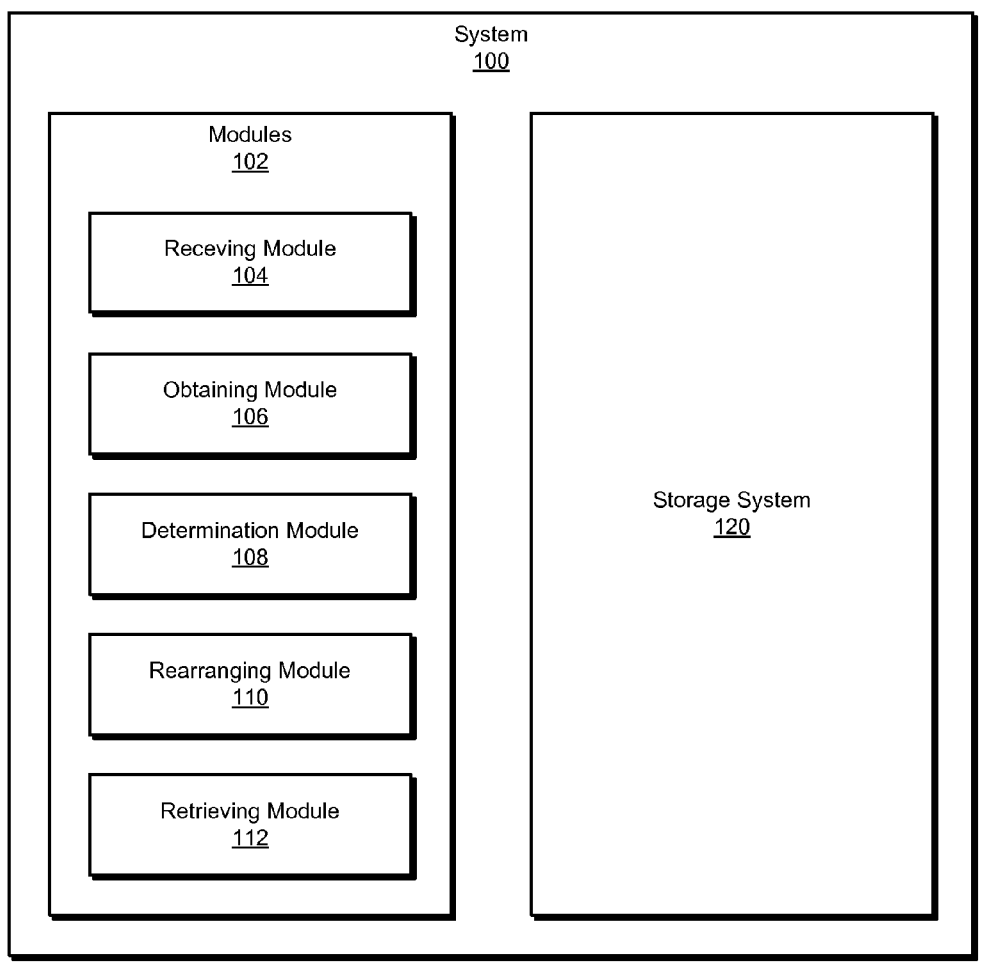
FIG. 1 is a block diagram of an exemplary system for retrieving data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for retrieving data. As will be explained in greater detail below, by rearranging access to data segments such that each data container is visited fewer times, systems described herein may retrieve data more efficiently from storage systems. Retrieving data more efficiently allows for backups to be created and maintained more efficiently, leading to more robust backup systems and greater protection from data loss.

The following will provide, with reference to FIGS. 1, 2, 4, and 5, detailed descriptions of exemplary systems for retrieving data. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for retrieving data. As illustrated in this figure, exemplary system 100 may include one or more modules 102 for performing one or more tasks. For example, and as will be explained in greater detail below, exemplary system 100 may include a receiving module 104 that may receive a request to retrieve data segments from a storage system 120 that stores the data segments in data containers. Exemplary system 100 may additionally include an obtaining module 106 that may obtain, for each data segment, information that indicates which data container stores the data segment. Exemplary system 100 may also include a determination module 108 that may determine, based on the information that indicates which data container stores each data segment, that using an initial access order to retrieve the data segments would result in visiting one or more data containers more than one time.

Exemplary system 100 may additionally include a rearranging module 110 that may rearrange access to one or more data segments such that retrieving the data segments results in visiting one or more data containers at least one fewer times than the data containers would be visited using the initial access order. Exemplary system 100 may also include a retrieving module 112 that may retrieve the data segments from the storage system based on the rearranged access order. Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more storage systems, such as storage system 120. In one example, storage system 120 may be configured to store data segments.

Storage system 120 may represent portions of a single storage system, database, or computing device or a plurality of storage systems or computing devices. For example, storage system 120 may represent a portion of computing system 610 in FIG. 6 and/or portions of exemplary network architecture 700 in FIG. 7. Alternatively, storage system 120 in FIG. 1 may represent one or more physically separate devices capable of being accessed by a computing device, such as computing system 610 in FIG. 6 and/or portions of exemplary network architecture 700 in FIG. 7.

Figure 2:
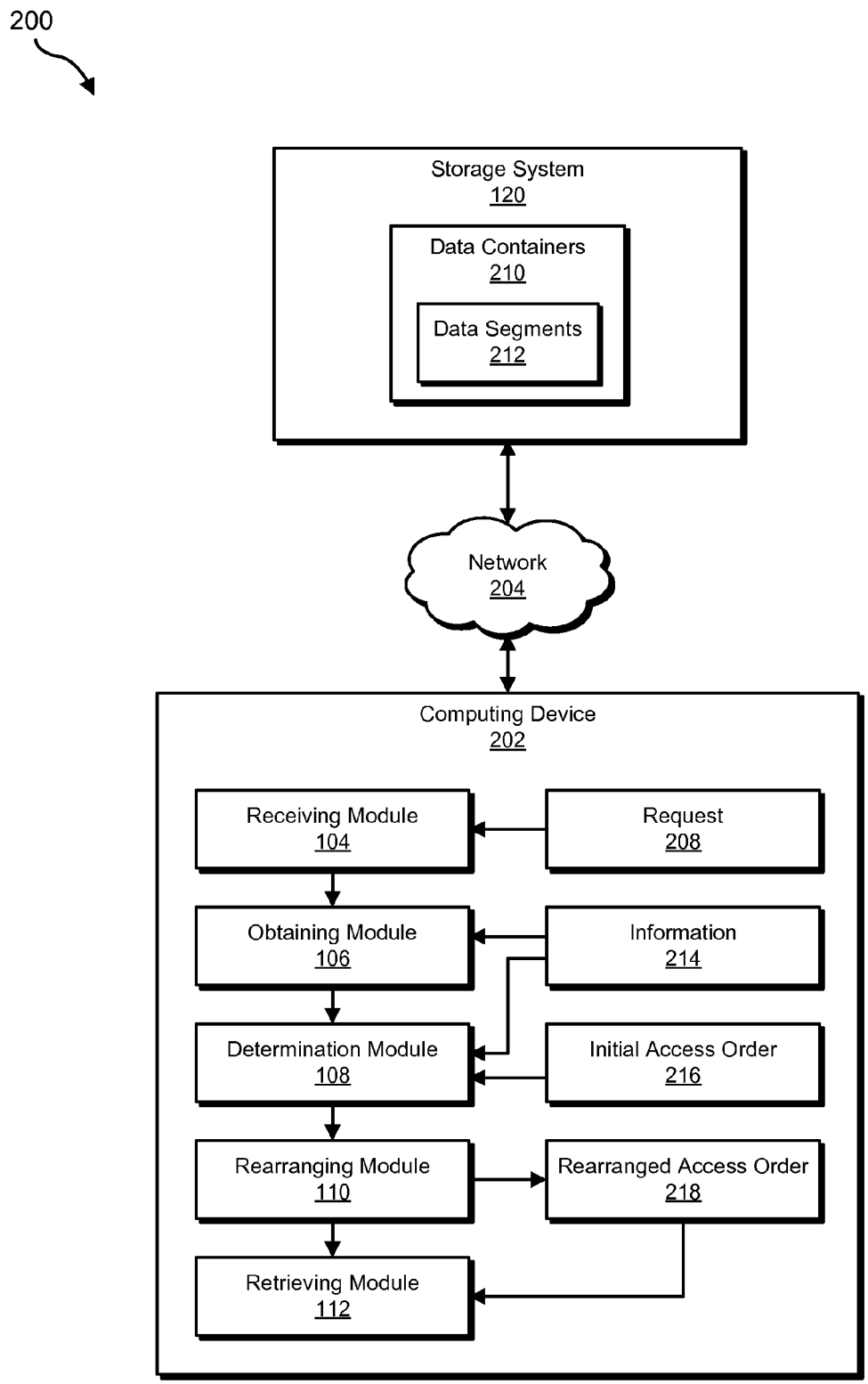
FIG. 2 is a block diagram of an additional exemplary system for retrieving data.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with storage system 120 via a network 204. In one example, computing device 202 may be programmed with one or more of modules 102 and/or may store all or a portion of the data in storage system 120.

In one embodiment, one or more of modules 102 from FIG. 1 may, when executed by at least one processor of computing device 202, enable computing device 202 to retrieve data. For example, and as will be described in greater detail below, receiving module 104 may receive a request 208 to retrieve data segments 212 from storage system 120 that stores data segments 212 in data containers 210. Obtaining module 106 may obtain, for each data segment from data segments 212, information 214 that indicates which data container from data containers 210 stores the data segment. Next, determination module 108 may determine, based on information 214 that indicates which data container stores each data segment, that using an initial access order 216 to retrieve data segments 212 would result in visiting one or more data containers from data containers 210 more than one time.

Based on this determination, rearranging module 110 may rearrange access to one or more data segments from data segments 212 such that retrieving data segments 212 results in visiting the one or more data containers at least one fewer times than the one or more data containers would be visited using initial access order 216. Finally, retrieving module 112 may retrieve data segments 212 from storage system 120 based on rearranged access order 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and storage system 120.

Figure 3:
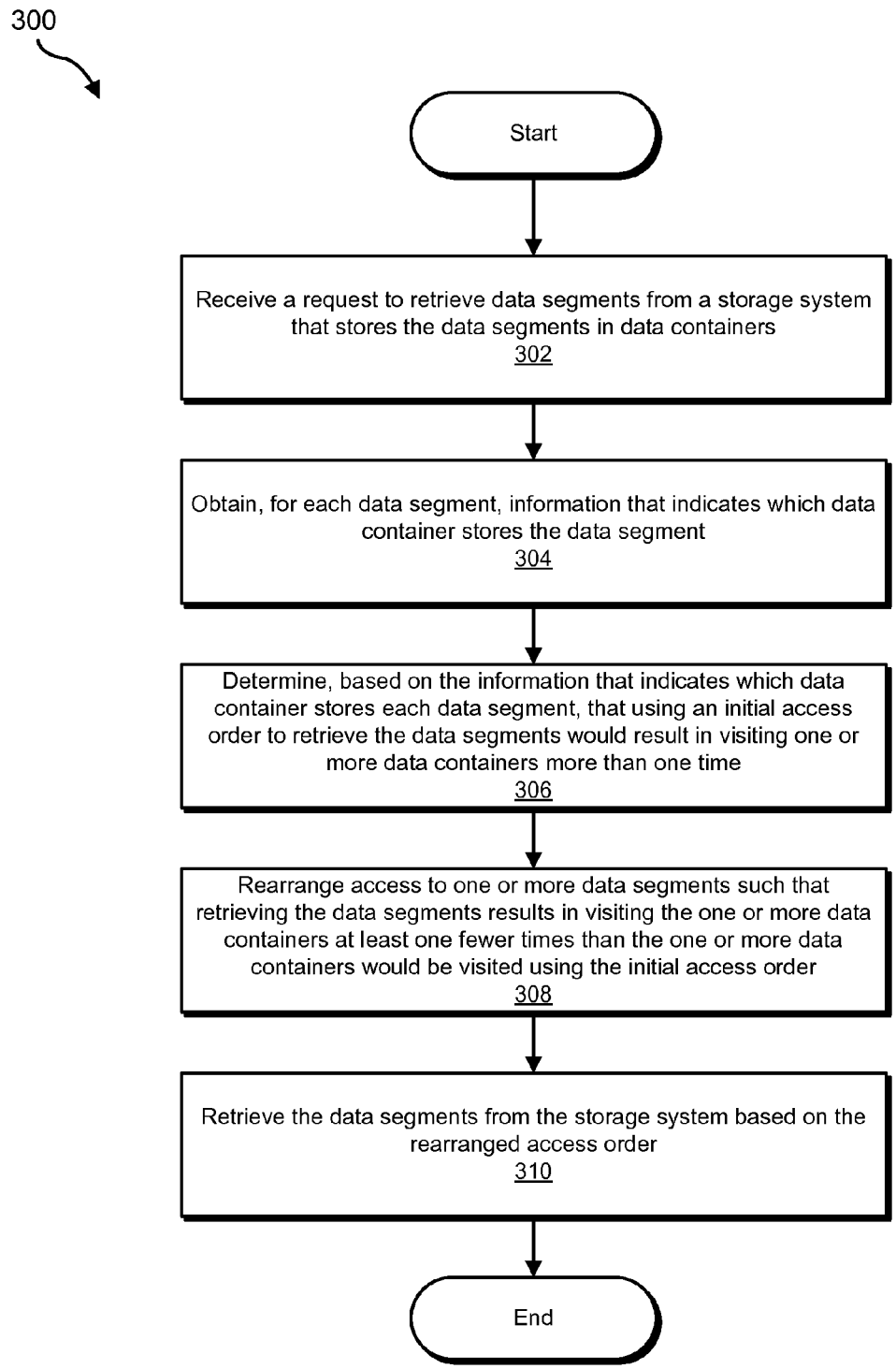
FIG. 3 is a flow diagram of an exemplary method for retrieving data.

FIG. 3 is a flow diagram of an exemplary computer-implemented method 300 for retrieving data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive a request to retrieve a plurality of data segments from a storage system that stores the plurality of data segments in a plurality of data containers. For example, at step 302 receiving module 104 may, as part of computing device 202 in FIG. 2, receive request 208 to retrieve data segments 212 from storage system 120 that stores data segments 212 in data containers 210.

The term "data segment," as used herein, generally refers to any data that may be stored on a storage system. A data segment may be all or a portion of a file, folder, application, script, and/or database. A data segment may be stored in any format. In some examples, data segments may be stored within data containers. The term "data container," as used herein, generally refers to any object used to compartmentalize stored data segments. Data containers may include abstractions and/or physical systems. Examples of data containers may include, without limitation, arrays, lists, trees, heaps, file partitions, hard drives, and/or memory.

Receiving module 104 may receive the request to retrieve the data segments in a variety of ways and/or contexts. For example, receiving module 104 may receive a request to retrieve data required by a backup deduplication application. In one example, receiving module 104 may receive a request from an AUTO IMAGE REPLICATION server to retrieve data segments that compose a backup image that is being replicated from one NETBACKUP system to another.

In one embodiment, storage system 120 may include a deduplication storage system where the data segments are fragmented across the data containers. In some examples, the data containers may be located on different servers, hard drives, and/or cloud storage systems. The fragmentation of the data segments may considerably slow down data retrieval, as each instance of opening and closing a data container to retrieve a data segment may come with a time and/or resource cost.

At step 304 one or more of the systems described herein may obtain, for each data segment from the plurality of data segments, information that indicates which data container from the plurality of data containers stores the data segment. For example, at step 304 obtaining module 106 may, as part of computing device 202 in FIG. 2, obtain, for each data segment from data segments 212, information 214 that indicates which data container from data containers 210 stores the data segment.

Obtaining module 106 may obtain the information in a variety of ways and/or contexts. For example, obtaining module 106 may obtain, for each data segment, the information that indicates which data container stores the data segment by retrieving the information from a database based on a fingerprint of the data container. In some embodiments, obtaining module 106 may have obtained the information before receiving module 104 received the request to retrieve the data segments. For example, obtaining module 106 may have access to a locally stored reference table of data segments and the fingerprints of their corresponding data containers.

At step 306 one or more of the systems described herein may determine, based on the information that indicates which data container stores each data segment, that using an initial access order to retrieve the plurality of data segments would result in visiting one or more data containers from the plurality of data containers more than one time. For example, at step 306 determination module 108 may, as part of computing device 202 in FIG. 2, determine, based on information 214 that indicates which data container stores each data segment, that using initial access order 216 to retrieve data segments 212 would result in visiting one or more data containers from data containers 210 more than one time.

The term "access order," as used herein, generally refers to any sequence of planned data retrieval from at least one location. In some examples, access order may refer to the sequence of data containers visited to retrieve data segments. For example, an access order may be, "data segment one from container one, data segment two from container two, data segment three from container three, data segment four from container one, data segment five from container seven, data segment six from container four."

The term "initial access order," as used herein, generally refers to a sequence of planned data retrieval that has not been rearranged according to the techniques described below. In some embodiments, an initial access order may be specified in a request to retrieve data. For example, a deduplication system may specify an initial access order in a request to retrieve backup data. Different requests may specify different initial access orders, even for the same data. In some examples, different applications may specify different initial access orders.

Determination module 108 may determine that the initial access order would result in revisiting one or more containers in a variety of ways. For example, determination module 108 may scan a list of container identifiers associated with the data segments to be retrieved in order to determine if any container identifier appears more than once. If a container identifier appears more than once in the list, the container may be visited multiple times in the initial access order.

In some examples, determination module 108 may determine that using the initial access order to retrieve the data segments would result in visiting one or more data containers more than one time by calculating a total number of data containers that store the data segments and determining that retrieving data in the initial access order may include a greater number of instances of visiting data containers than the total number of data containers. For example, determination module 108 may calculate the total number of unique data containers based on a list of container fingerprints and may calculate a total number of data containers visited by determining the size of a list of containers to be visited to retrieve the data segments in the initial access order. In this example, if the size of the list of container fingerprints is smaller than the list of containers to be visited, at least some containers may be visited more than once in the initial access order.

Determination module 108 may determine that the initial access order may result in repeat visits by calculating repeat visits in a number of ways. In some examples, determination module 108 may determine that using the initial access order to retrieve the plurality of data segments would result in visiting one or more data containers from the plurality of data containers more than one time by calculating a ratio of how often data containers within the plurality of data containers would be revisited using the initial access order. In some embodiments, determination module 108 may calculate the total number of unique containers in the initial access order, the total number of switches between different containers in the initial access order, and/or the total number of times containers are revisited in the initial access order. For example, determination module 108 may determine that there are half as many unique data containers as data containers that would be visited using the initial access order and therefore each data container may be revisited an average of one time. In this example, there may be significant improvements in efficiency if the access order is rearranged to visit each data container only once.

At step 308 one or more of the systems described herein may rearrange access to one or more data segments from the plurality of data segments such that retrieving the plurality of data segments results in visiting the one or more data containers at least one fewer times than the one or more data containers would be visited using the initial access order. For example, at step 308 rearranging module 110 may, as part of computing device 202 in FIG. 2, rearrange access to one or more data segments from data segments 212 such that retrieving data segments 212 results in visiting the one or more data containers at least one fewer times than the one or more data containers would be visited using initial access order 216.

Rearranging module 110 may rearrange access to the data segments in a variety of ways. In some examples, rearranging module 110 may rearrange access to the one or more data segments by moving a visit to a container adjacent to another visit to the same container and/or combining the two visits. Rearranging module 110 may rearrange the access order to reduce repeat visits to data containers without eliminating repeat visits entirely. Alternatively, rearranging module 110 may group access to data segments by container such that each data container is visited a single time when the data segments are retrieved.

Figure 4:
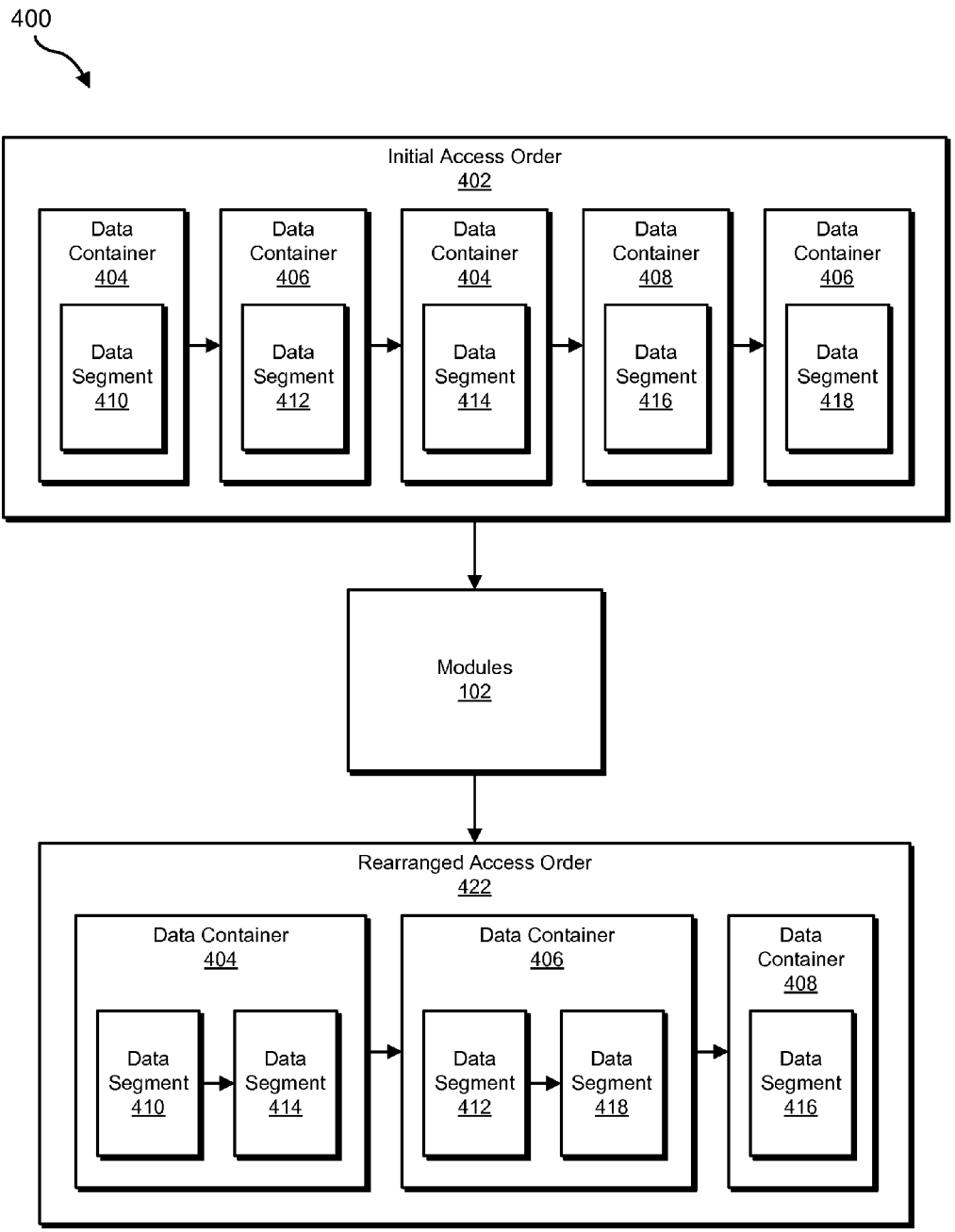
FIG. 4 is a block diagram of an exemplary computing system for retrieving data.

For example, rearranging module 110 may sort the access order by container identifiers and then merge visits to the same container so that each container is only visited once. FIG. 4 is a block diagram of an exemplary computing system 400 for retrieving data more efficiently by rearranging access orders. As illustrated in FIG. 4, initial access order 402 may access the data in the order of data segment 410 in data container 404, data segment 412 in data container 406, data segment 414 in data container 404, data segment 416 in data container 408, and/or data segment 418 in data container 406. Modules 102 may rearrange initial access order 402 into rearranged access order 422. Rearranged access order 422 may access data in the order of data segments 410 and/or 414 in data container 404, data segments 412 and/or 418 in data container 406, and/or data segment 416 in data container 408. Rearranged access order 422 may visit each container only once.

In one embodiment, one or more data segments may be stored adjacently within at least one data container and rearranging module 110 may rearrange access to the data segments such that the data segments are accessed sequentially within the data container. For example, the initial access order may include accessing a data segment, a non-adjacent data segment, and then a data segment adjacent to the first data segment. In this example, rearranging module 110 may rearrange the access order such that the two adjacent segments are accessed sequentially.

Figure 5:
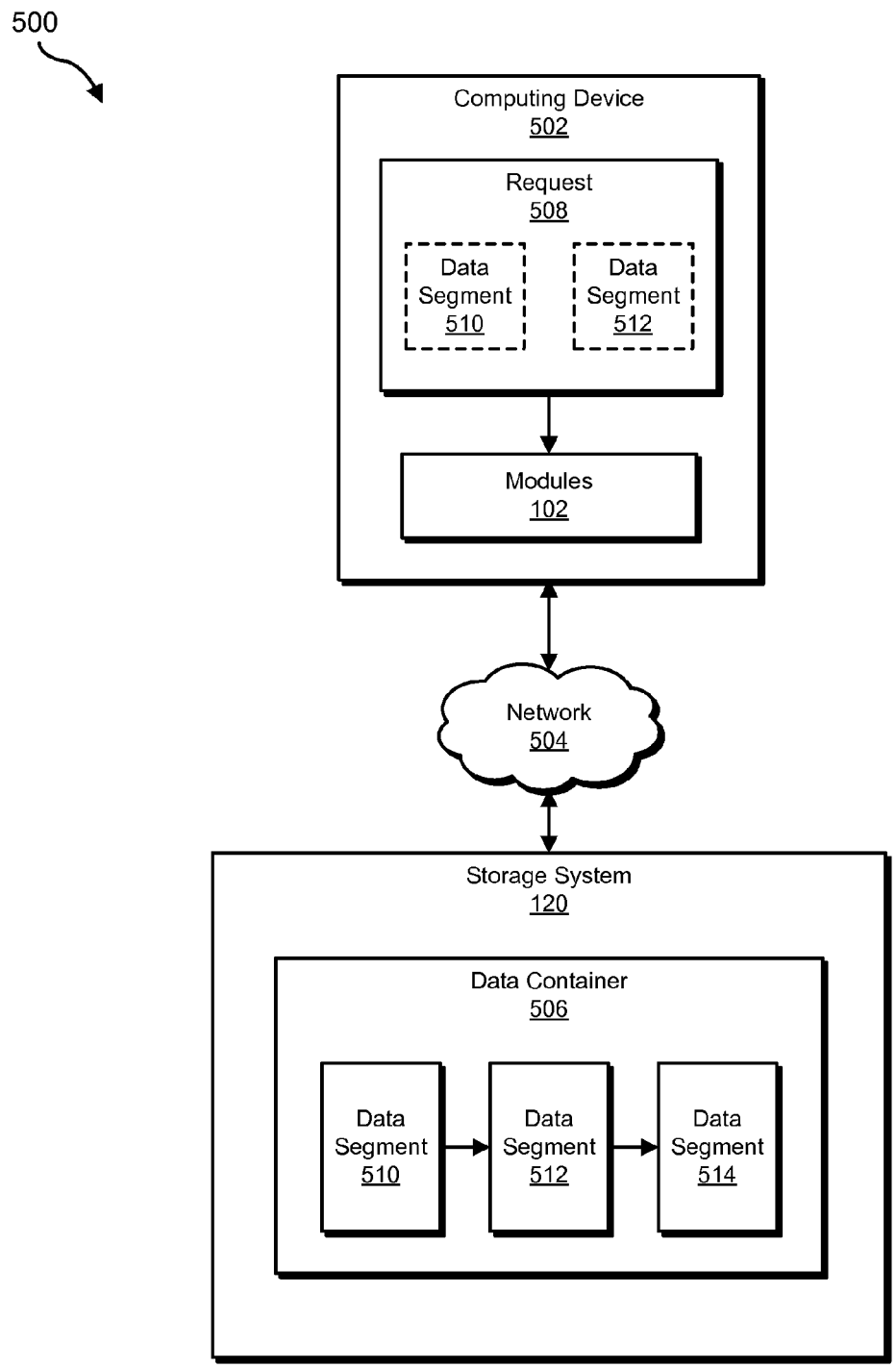
FIG. 5 is a block diagram of an exemplary computing system for retrieving data.

In some examples, retrieving module 112 may retrieve the plurality of data segments by prefetching a portion of the one or more data segments that are accessed sequentially within the at least one data container by retrieving a data segment that has not yet been requested but is predicted to be requested and is adjacent to a previous data segment that has been requested. FIG. 5 is a block diagram of an exemplary computing system 500 for retrieving data by prefetching data segments. As illustrated in FIG. 5, computing device 502 may be connected to storage system 120 via network 504 and/or may include modules 102. Modules 102 may receive request 508, which may request data segments 510 and/or 512. Storage system 102 may include data container 506, which may include adjacent data segments 510, 512 and/or 514. Retrieving module 112 may retrieve data segments 510 and/or 512 and then may prefetch data segment 514 based on the request for data segments 510 and/or 512.

Returning to FIG. 3, at step 310 one or more of the systems described herein may retrieve the plurality of data segments from the storage system based on the rearranged access order. For example, at step 310 retrieving module 112 may, as part of computing device 202 in FIG. 2, retrieve data segments 212 from storage system 120 based on rearranged access order 218.

Retrieving module 112 may retrieve the data segments in a variety of ways. For example, retrieving module 112 may retrieve the data segments from the storage system, reorder the retrieved data segments into the initial access order specified by the request, and send a response including the data segments to the computing system that made the request. In some examples, retrieving module 112 may not reorder the data segments and may send a response including the data segments in the rearranged access order.

As explained above, systems described herein may receive a request for data segments that are stored in a storage system. In some embodiments, the request may be made on behalf of an application that is replicating a backup image as part of a backup deduplication system. The data segments may be stored in a large number of data containers in the storage system and/or may be fragmented across the data containers such that the initial access order is far from optimal.

Systems described herein may calculate that at least one data container would be visited multiple times according to the initial access order and that efficiency gains may be made by rearranging the access order. Techniques described above may rearrange the access order so that each data container is visited only once, reducing the costs associated with opening and closing data containers. In addition, the rearranged sort order may place adjacent data segments within the same data container sequentially, allowing processors to take advantage of readahead and/or prefetching capabilities to fetch data more efficiently.

Systems described may retrieve data faster than traditional systems. Below is a table illustrating a test of an implementation of the systems and methods described above on a network with 20 megabytes per second (MB/s) throughput.

|  | Test 1 (MB/s) | Test 2 (MB/s) | Average (MB/s) |
|---|---|---|---|
| traditional methods | 10.05 | 9.76 | 9.91 |
| systems described herein | 18.88 | 18.72 | 18.80 |

As illustrated in the table above, systems described herein may perform significantly better than traditional methods under testing conditions. By rearranging access order to minimize container visits and retrieve adjacent data sequentially, systems described herein may increase the efficiency of data retrieval and improve the efficiency of backup replication. Increasing the efficiency of backup replication may allow backups to be created and updated more frequently, increasing the overall safety of stored data.

Figure 6:
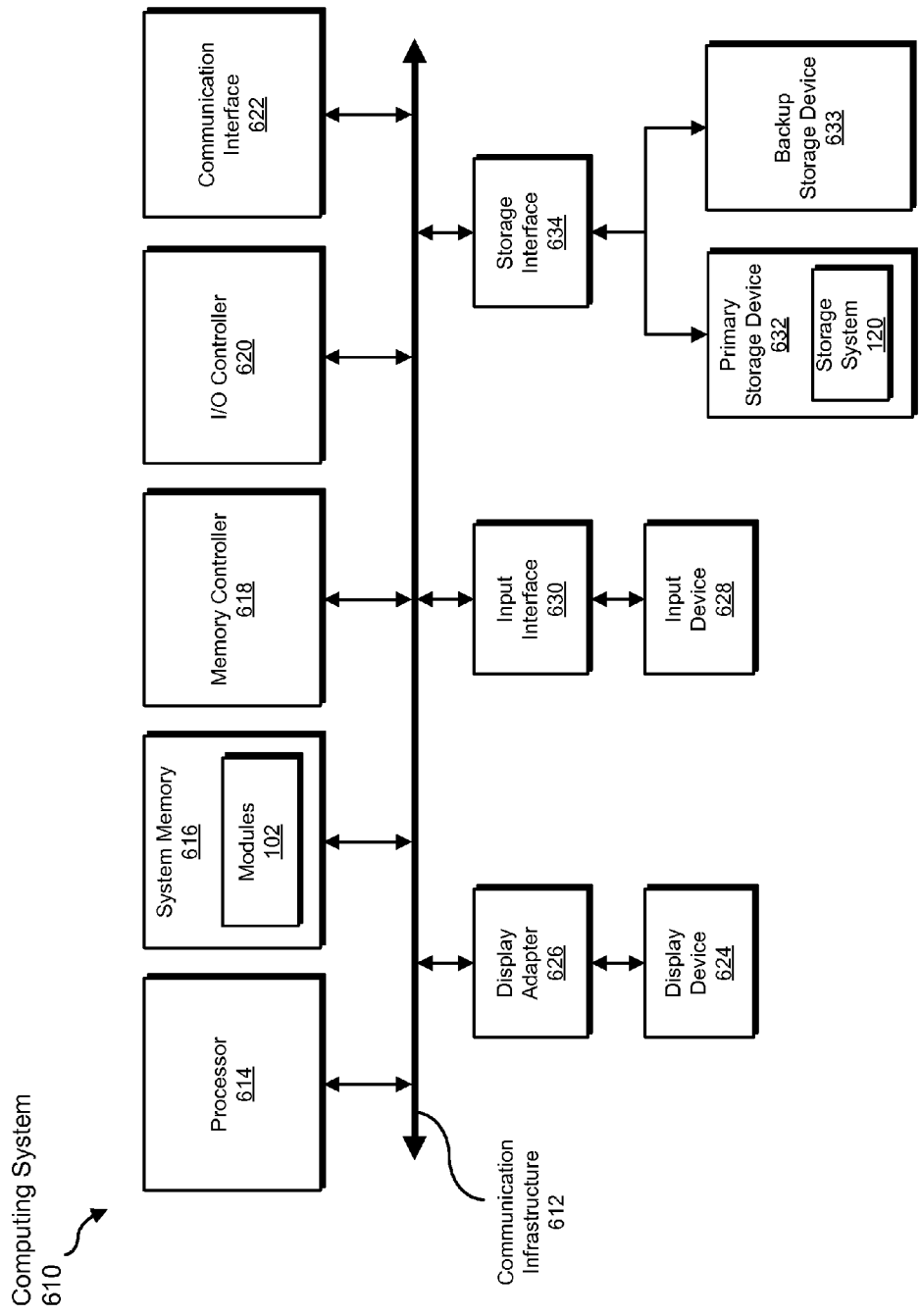
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, storage system 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
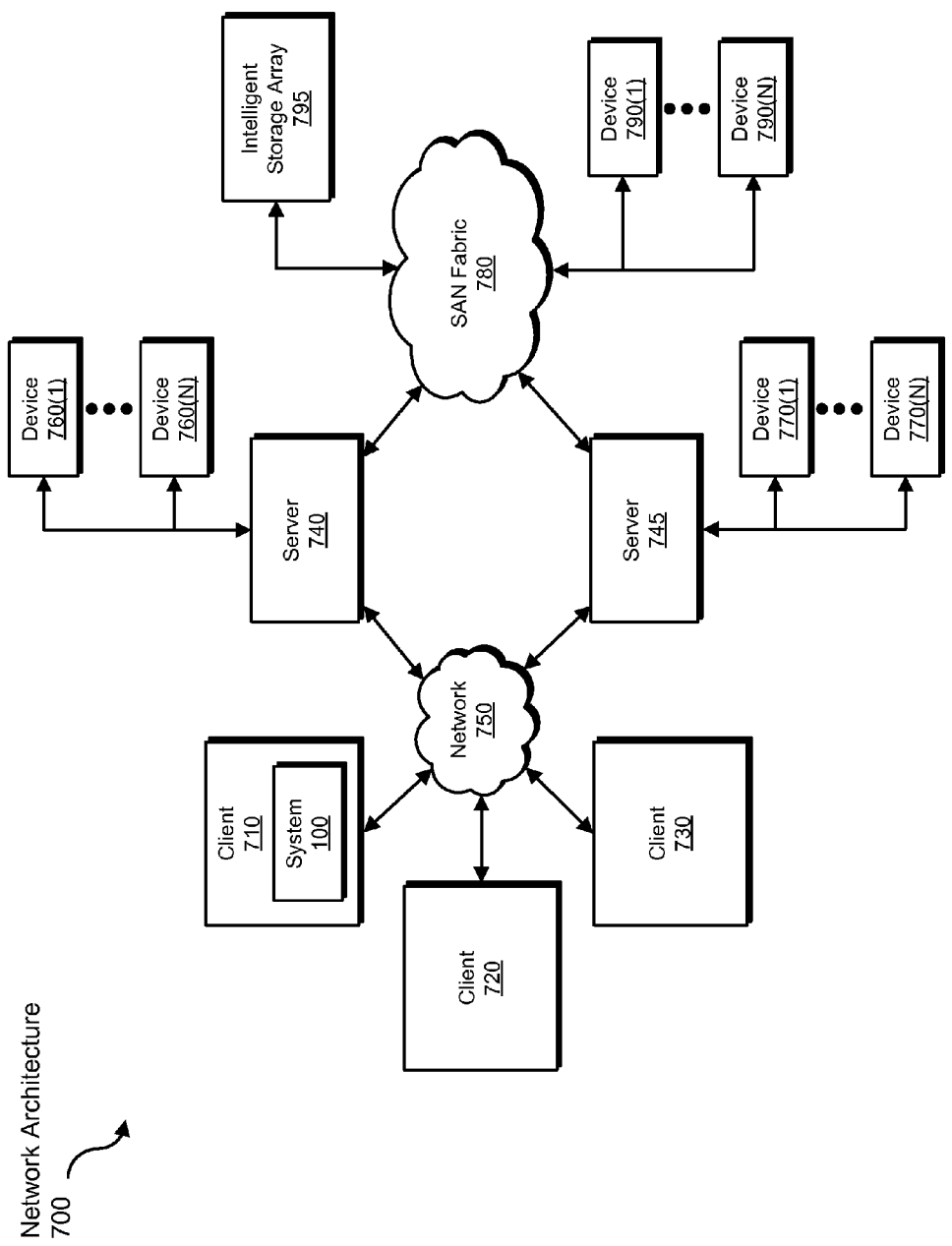
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for retrieving data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a data access order to be transformed, transform the data access order, output a result of the transformation to a retrieval module, use the result of the transformation to retrieve data, and store the result of the transformation to a storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for retrieving data, at least a portion of the method being performed by a computing device comprising at least one processor, the method comprising:

receiving a request to retrieve a plurality of data segments from a storage system that stores the plurality of data segments in a plurality of data containers;

obtaining, for each data segment from the plurality of data segments, information that indicates which data container from the plurality of data containers stores the data segment;

determining, based on the information that indicates which data container stores each data segment, that using an initial access order to retrieve the plurality of data segments would result in visiting one or more data containers from the plurality of data containers more than one time;

rearranging access to one or more data segments from the plurality of data segments such that retrieving the plurality of data segments results in visiting the one or more data containers at least one fewer times than the one or more data containers would be visited using the initial access order, wherein rearranging access to the one or more data segments comprises grouping access to the one or more data segments, the grouping comprising:

sorting the initial access order by one or more data container identifiers; and merging visits to a same data container in the plurality of data containers such that each data container in the plurality of data containers is visited a single time when the plurality of data segments are retrieved;

retrieving the plurality of data segments from the storage system based on the rearranged access order.

2. The computer-implemented method of claim 1, wherein the storage system comprises a deduplication storage system where the plurality of data segments are fragmented across the plurality of data containers.

3. The computer-implemented method of claim 1, wherein the one or more data segments are stored adjacently within the at least one data container and rearranging access to the one or more data segments comprises rearranging access to the one or more data segments such that the one or more data segments are accessed sequentially within the at least one data container.

4. The computer-implemented method of claim 3, wherein retrieving the plurality of data segments comprises prefetching a portion of the one or more data segments that are accessed sequentially within the at least one data container by retrieving a data segment that has not yet been requested but is predicted to be requested and is adjacent to a previous data segment that has been requested.

5. The computer-implemented method of claim 1, wherein determining that using the initial access order to retrieve the plurality of data segments would result in visiting one or more data containers from the plurality of data containers more than one time comprises:

calculating a total number of data containers that store the plurality of data segments;

determining that retrieving data in the initial access order would comprise a greater number of instances of visiting data containers than the total number of data containers.

6. The computer-implemented method of claim 1, wherein determining that using the initial access order to retrieve the plurality of data segments would result in visiting one or more data containers from the plurality of data containers more than one time comprises calculating a ratio of how often data containers within the plurality of data containers would be revisited using the initial access order.

7. The computer-implemented method of claim 1, wherein rearranging access to the one or more data segments comprises grouping access to data segments within the plurality of data segments by container such that each data container in the plurality of data containers is visited a single time when the plurality of data segments are retrieved.

8. The computer-implemented method of claim 1, wherein obtaining, for each data segment from the plurality of data segments, the information that indicates which data container from the plurality of data containers stores the data segment comprises retrieving the information from a database based on a fingerprint of the data container.

9. A system for retrieving data, the system comprising:

a receiving module, stored in memory, that receives a request to retrieve a plurality of data segments from a storage system that stores the plurality of data segments in a plurality of data containers;

an obtaining module, stored in memory, that obtains, for each data segment from the plurality of data segments, information that indicates which data container from the plurality of data containers stores the data segment;

a determination module, stored in memory, that determines, based on the information that indicates which data container stores each data segment, that using an initial access order to retrieve the plurality of data segments would result in visiting one or more data containers from the plurality of data containers more than one time;

a rearranging module, stored in memory, that rearranges access to one or more data segments from the plurality of data segments such that retrieving the plurality of data segments results in visiting the one or more data containers at least one fewer times than the one or more data containers would be visited using the initial access order, wherein the rearranging module rearranges access to the one or more data segments by grouping access to the one or more data segments, the grouping comprising:

sorting the initial access order by one or more data container identifiers; and merging visits to a same data container in the plurality of data containers such that each data container in the plurality of data containers is visited a single time when the plurality of data segments are retrieved;

a retrieving module, stored in memory, that retrieves the plurality of data segments from the storage system based on the rearranged access order;

at least one physical processor configured to execute the receiving module, the obtaining module, the determination module, the rearranging module, and the retrieving module.

10. The system of claim 9, wherein the storage system comprises a deduplication storage system where the plurality of data segments are fragmented across the plurality of data containers.

11. The system of claim 9, wherein the one or more data segments are stored adjacently within the at least one data container and rearranging access to the one or more data segments comprises rearranging access to the one or more data segments such that the one or more data segments are accessed sequentially within the at least one data container.

12. The system of claim 11, wherein the retrieving module retrieves the plurality of data segments by prefetching a portion of the one or more data segments that are accessed sequentially within the at least one data container by retrieving a data segment that has not yet been requested but is predicted to be requested and is adjacent to a previous data segment that has been requested.

13. The system of claim 9, wherein the determination module determines that using the initial access order to retrieve the plurality of data segments would result in visiting the one or more data containers from the plurality of data containers more than one time by:

calculating a total number of data containers that store the plurality of data segments;

determining that retrieving data in the initial access order would comprise a greater number of instances of visiting data containers than the total number of data containers.

14. The system of claim 9, wherein the determination module determines that using the initial access order to retrieve the plurality of data segments would result in visiting the one or more data containers from the plurality of data containers more than one time by calculating a ratio of how often data containers within the plurality of data containers would be revisited using the initial access order.

15. The system of claim 9, wherein the rearranging module rearranges access to the one or more data segments by grouping access to data segments within the plurality of data segments by container such that each data container in the plurality of data containers is visited a single time when the plurality of data segments are retrieved.

16. The system of claim 9, wherein the obtaining module obtains, for each data segment from the plurality of data segments, the information that indicates which data container from the plurality of data containers stores the data segment by retrieving the information from a database based on a fingerprint of the data container.

17. A non-transitory computer-readable medium comprising one or more computer-readable instructions that, when executed by at least one processor of a computing device, cause the computing device to:
- receive a request to retrieve a plurality of data segments from a storage system that stores the plurality of data segments in a plurality of data containers;
- obtain, for each data segment from the plurality of data segments, information that indicates which data container from the plurality of data containers stores the data segment;
- determine, based on the information that indicates which data container stores each data segment, that using an initial access order to retrieve the plurality of data segments would result in visiting one or more data containers from the plurality of data containers more than one time;
- rearrange access to one or more data segments from the plurality of data segments such that retrieving the plurality of data segments results in visiting the one or more data containers at least one fewer times than the one or more data containers would be visited using the initial access order, wherein rearranging access to the one or more data segments comprises grouping access to the one or more data segments, the grouping comprising:

sorting the initial access order by one or more data container identifiers; and merging visits to a same data container in the plurality of data containers such that each data container in the plurality of data containers is visited a single time when the plurality of data segments are retrieved;

retrieve the plurality of data segments from the storage system based on the rearranged access order.

18. The non-transitory computer-readable medium of claim 17, wherein the storage system comprises a deduplication storage system where the plurality of data segments are fragmented across the plurality of data containers.

19. The non-transitory computer-readable medium of claim 17, wherein the one or more data segments are stored adjacently within the at least one data container and rearranging access to the one or more data segments comprises rearranging access to the one or more data segments such that the one or more data segments are accessed sequentially within the at least one data container.

20. The non-transitory computer-readable medium of claim 19, wherein the one or more computer-readable instructions cause the computing device to retrieve the plurality of data segments by prefetching a portion of the one or more data segments that are accessed sequentially within the at least one data container by retrieving a data segment that has not yet been requested but is predicted to be requested and is adjacent to a previous data segment that has been requested.

* * * * *